United States Patent [19]

O'Brien

[11] Patent Number: 4,694,676
[45] Date of Patent: Sep. 22, 1987

[54] METHOD OF MANUFACTURING TRI-POT UNIVERSAL JOINT HOUSINGS

[75] Inventor: Gerald A. O'Brien, Frankenmuth, Mich.

[73] Assignee: General Motors Corporation, Detroit, Mich.

[21] Appl. No.: 402,829

[22] Filed: Jul. 28, 1982

[51] Int. Cl.[4] .............................................. B21K 1/26
[52] U.S. Cl. ...................................... 72/348; 72/256; 72/356
[58] Field of Search ................. 72/347, 348, 356, 377, 72/267, 359, 256

[56] References Cited

U.S. PATENT DOCUMENTS

| | | | |
|---|---|---|---|
| 2,755,543 | 7/1956 | Dunn et al. | 72/256 |
| 2,917,823 | 12/1959 | Fletcher | 72/267 X |
| 3,336,782 | 8/1967 | Peras | 72/256 |
| 3,927,449 | 12/1975 | Gibble et al. | 72/267 |
| 4,094,183 | 6/1978 | Meltler | 72/356 |
| 4,120,176 | 10/1978 | Ebbinghaus . | |
| 4,192,154 | 3/1980 | Nakamura | 64/21 |
| 4,196,598 | 4/1980 | Hirai | 64/21 |
| 4,205,925 | 6/1980 | Fisher | 64/21 |
| 4,242,888 | 1/1981 | Komeiji | 64/21 |
| 4,279,528 | 7/1981 | Mangiavacchi | 64/21 |
| 4,287,650 | 10/1979 | Fisher et al. | 29/148.4 R |
| 4,287,747 | 9/1981 | Koshimaru et al. . | |
| 4,381,659 | 5/1983 | Welch | 72/340 |

FOREIGN PATENT DOCUMENTS

| | | | |
|---|---|---|---|
| 601775 | 3/1958 | Canada | 29/1.3 |
| 1032064 | 6/1953 | France | 72/359 |
| 19806 | 6/1973 | Japan . | |
| 81861 | 7/1978 | Japan . | |
| 5120 | 1/1980 | Japan . | |
| 59553 | 5/1981 | Japan . | |
| 70049 | 4/1982 | Japan . | |

OTHER PUBLICATIONS

"1981 Model of New Civic & Photos" #81095, 82229.

Primary Examiner—Lowell A. Larson
Attorney, Agent, or Firm—F. J. Fodale

[57] ABSTRACT

A one-piece tri-pot universal joint housing is cold formed from a part having a shank at one end and an enlarged cylindrical head at the opposite end. The enlarged head is backward extruded to form a triangularly shaped cup which is then draw-ironed to provide a tri-lobal housing portion integrally attached to the shank.

12 Claims, 14 Drawing Figures

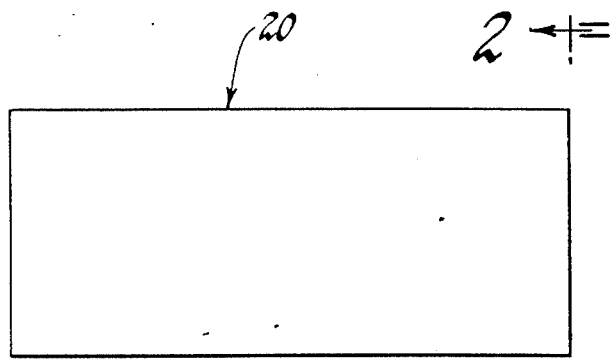
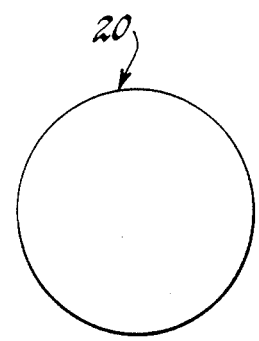
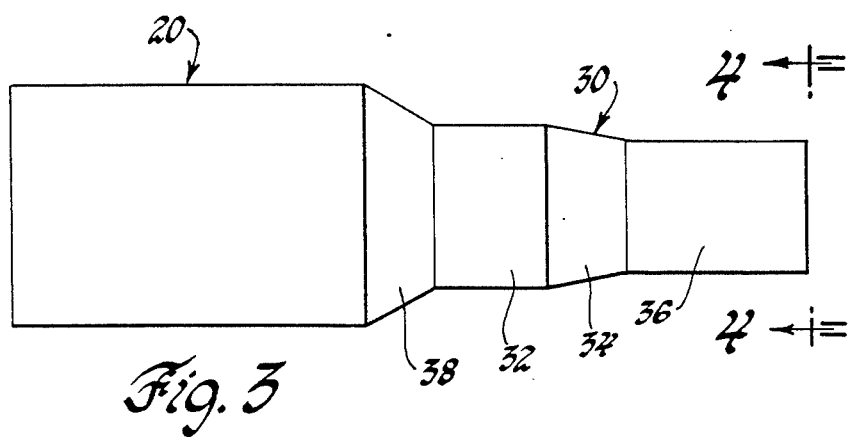
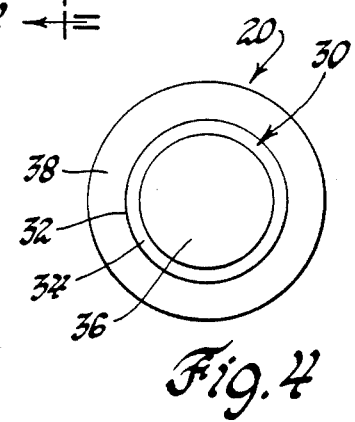
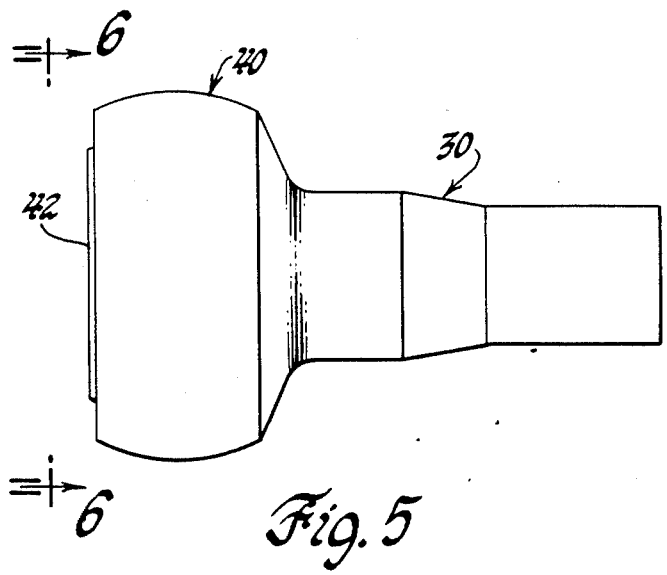
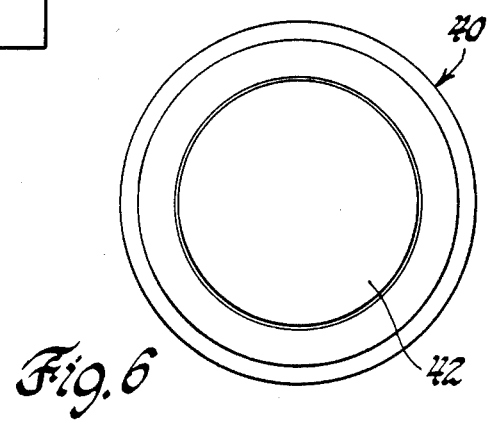

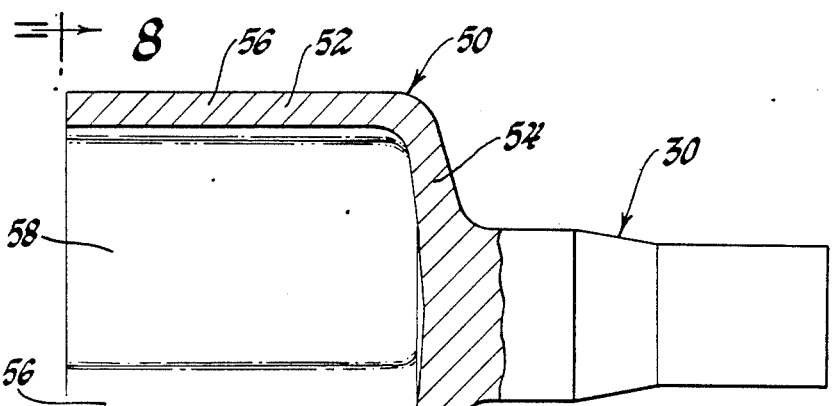
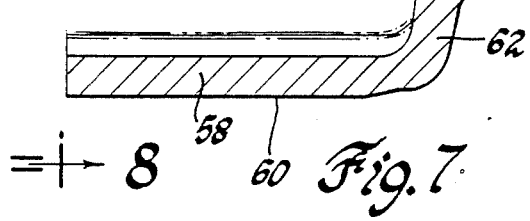
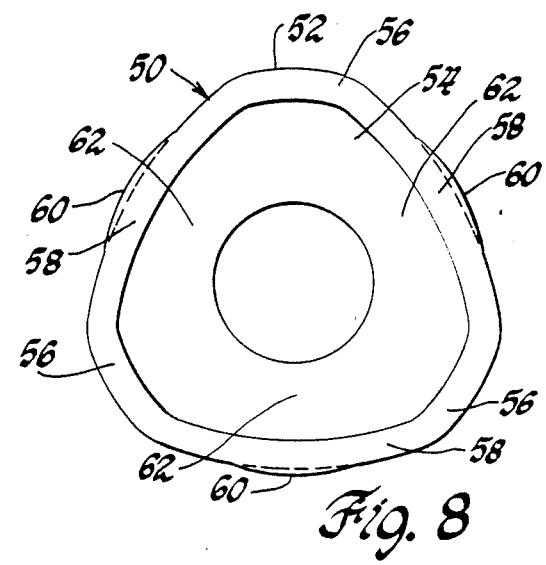
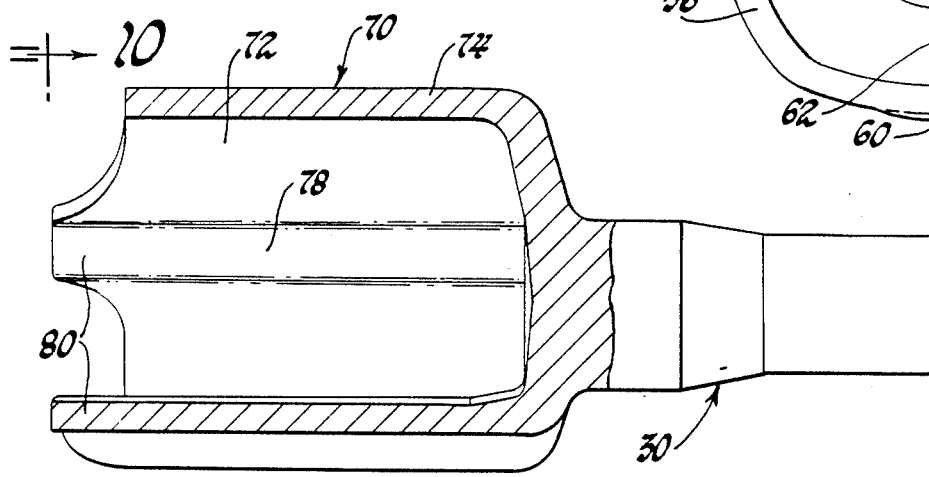
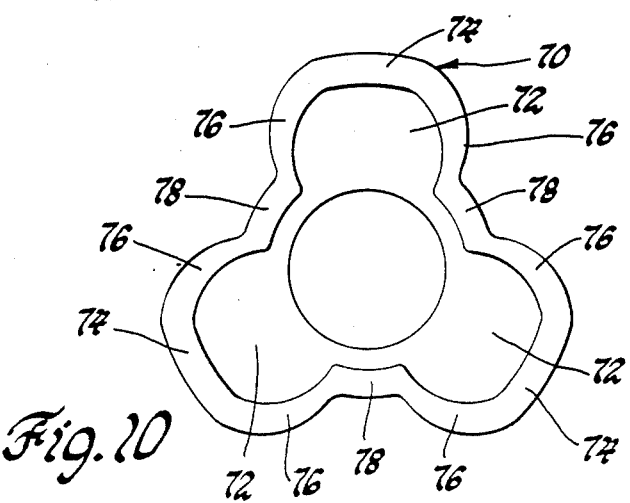

METHOD OF MANUFACTURING TRI-POT UNIVERSAL JOINT HOUSINGS

This invention relates generally to tri-pot universal joints and, more particularly, to a method of manufacturing a tri-pot universal joint housing having a closure and an attachment shank at one end.

A well known method of manufacturing such housings comprises casting steel blanks approximately the shape of the housing and then machining the casting to the final shape and dimensions.

This method is relatively expensive and has several drawbacks from a manufacturing standpoint including the necessity for a considerable amount of finish machining. The housings produced by this method are also relatively heavy.

Recently, such housings have also been made commercially from a cut-off length of commercially available tube as described in U.S. patent application Ser. No. 232,905, and now U.S. Pat. No. 4,381,659 filed by Mack D. Welch and William B. Speer on Feb. 9, 1981.

In this method, the middle of the tube is formed into a tri-lobal section which is broached to provide the internal ball tracks while the end portions of the tube are left sufficiently intact so that circular bands can be machined at each end for securing a closure and attachment piece at one end of the housing and a conventional sealing boot at the other end of the housing.

This method offers several advantages over the older method of manufacturing the housing from a cast steel blank, particularly in cost savings, since an inexpensive tube is used in place of an expensive cast blank and the amount of finish machining required is reduced considerably.

Moreover, the resulting housing is considerably lighter in weight and smaller in diameter than those made from steel castings. The weight savings results primarily from the housing part made from the tube being nearly uniform in thickness throughout. The smaller diameter is possible because the ball tracks are broached and, consequently, the ball tracks need not be circular as in the case of the steel castings where the ball tracks are machined by rotary cutting tools.

The new method, however, has a disadvantage in that it requires the manufacture of a separate closure and attachment shank piece which is secured to an end of the housing part made from the tube.

U.S. Pat. No. 3,336,782 issued to Lucien Peras on Aug. 22, 1967 discloses a tri-pot universal joint housing having a closure and attachment shank at one end which is made in one piece as shown in FIGS. 3 and 4 of the patent drawing. According to the Peras specification, the housing may be formed by direct extrusion in the cold state, followed or not by a cold drawing operation, in the case where case hardening steels are employed. This one-piece cold formed housing, however, like the housing manufactured from a steel casting is formed with a side wall which is very thick between the ball tracks. Thus, the one-piece cold formed housings made according to the Peras patent, waste material and are unnecessarily heavy. Furthermore, the ball grooves are wide and shallow (i.e., about twice as wide as deep) due to the difficulty of extruding the side wall which varies considerably in thickness from the thin wall portions at the end of the ball tracks to the very thick wall portions between the ball tracks.

The object of this invention is to provide a method for manufacturing a tri-pot universal joint housing wherein the housing portion and the closure and attachment shank are formed as one-piece and the side wall of the housing portion is formed in a tri-lobal shape of substantially uniform wall thickness so as to save material, avoid unnecessary weight and reduce the constraints on the shape of the internal ball tracks.

Another object of this invention is to provide a method for manufacturing a one-piece tri-pot universal joint housing by cold forming techniques which permit internal ball tracks of a narrower and deeper shape than those formed heretofore.

Still another object of this invention is to provide a method for manufacturing a one-piece tri-pot universal joint housing in which relatively deep internal ball tracks are finished by cold forming so as to eliminate a significant amount of finish machining and the need for circular ball tracks.

Other objects and features of the invention will become apparent to those skilled in the art as the disclosure is made in the following detailed description of a preferred embodiment of the invention as illustrated in the accompanying sheets of drawing in which:

FIG. 1 is a longitudinal side view of a cylindrical slug used for manufacturing a tri-pot universal joing housing in accordance with this invention.

FIG. 2 is an end view of the cylindrical slug shown in FIG. 1.

FIG. 3 is a longitudinal side view of an extruded part made from the cylindrical slug shown in FIGS. 1 and 2.

FIG. 4 is an end view of the extruded part shown in FIG. 3.

FIG. 5 is a longitudinal side view of an upset part made from the extruded part shown in FIGS. 3 and 4.

FIG. 6 is an end view of the upset part shown in FIG. 5.

FIG. 7 is a longitudinal, partially sectioned side view of a backward extruded part made from the upset part shown in FIGS. 5 and 6.

FIG. 8 is an end view of the backward extruded part shown in FIG. 7.

FIG. 9 is a longitudinal, partially sectioned side view of a draw-ironed part made from the backward extruded part shown in Figures 7 and 8.

FIG. 10 is an end view of the draw-ironed part shown in FIG. 9.

Figure 11:
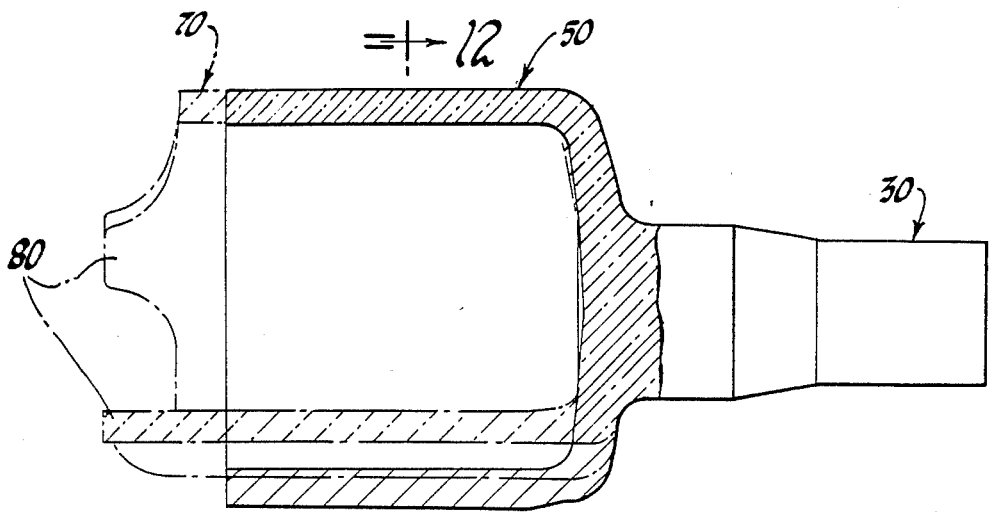
FIG. 11 is a comparison of FIGS. 7 and 9.

Referring now to the drawing and particularly to FIGS. 1 and 2, my method of manufacturing a tri-pot housing starts with a cylindrical slug 20 consisting of a predetermined length of round, preferably drawn steel, bar stock. Several slugs may be conveniently provided by sequentially cutting the appropriate length from the end of commercially available bar stock by procedures well known in the art.

The slug 20 is annealed in a conventional manner, coated with a suitable lubricant and then cold formed in a press in three stages. The first two stages are directed primarily to forming an attachment shank 30 at one end of the blank as shown in FIGS. 3 and 4. In the first stage, not shown, the slug 20 is extruded to form a uniform shank at the one end. The end of the shank is then reduced by a second forward extrusion operation to the shape shown in FIGS. 3 and 4 wherein the attachment shank 30 comprises an intermediate cylindrical section 32, a conical mid-section 34 and a reduced cylindrical end section 36; the intermediate cylindrical section 32 being attached to the slug 20 by a conical transition 38.

In the third stage, the twice extruded part shown in FIGS. 3 and 4 is upset to form an enlarged solid head 40 at the opposite end of the slug 20 as shown in FIGS. 5 and 6. The head 40 is nearly part spherical in shape and the end face has a thin circular embossment or relief 42 resulting from the use of a centering cavity in the moveable upsetting die in accordance with standard practice. The upsetting operation also reduces the length of the attachment shank 30 and increases the diameter of the sections 32 and 36 slightly.

The upset part, shown in FIGS. 5 and 6, is then washed, annealed and coated with a suitable lubricant, after which the upset part is backward extruded forming the head 40 into a hollow cup 50 having a triangularly shaped annular side wall 52 and a triangularly shaped bottom wall 54 which is integrally attached to the shank 30 as shown in FIGS. 7 and 8. The upset part can be and is preferably backward extruded in a single stage at room temperature although a multistage operation is possible.

The side wall 52 has three curved truncated apexes 56 which ultimately form the outer end walls of the three ball tracks. The curved apexes 56 are circumferentially spaced and connected by three longer curved legs 58 which ultimately form the curved radial side walls of the three ball tracks and arcuate webs connecting the inner ends of the curved radial side walls of adjacent ball tracks. The side wall 52 is substantially uniform in thickness even taking into account the middle portions of the curved legs 58 which are thickened slightly by a longitudinal bump 60 in the outer surface. The bumps 60 start at the open end of the cup 50 and end with a shallow taper just ahead of the corner radius at the bottom wall 54 of the cup 50 as shown in FIG. 7. These bumps 60 provide additional material for the arcuate webs connecting the inner ends of the curved radial walls which are formed in the draw-ironing operation described later.

The cross-section of the bottom wall 54 varies due to its triangular shape as demonstrated in FIG. 7 which shows the maximum and minimum radial extensions of the bottom wall 54 from the central shank 30. As can be seen from FIG. 7, the bottom wall 54 increases in thickness in the radially inward direction. The thickness of the outer portion of the bottom wall 54 (generally from the shank 30 outward) should be matched to the thickness of the side wall 52 as nearly as possible. On the one hand, the outer portion of the bottom wall 54 should have a minimum thickness at least equal to the thickness of the side wall 52 to avoid tearing in the subsequent draw-ironing operation. On the other hand, the maximum thickness cannot exceed the side wall thickness by an excessive amount because the outer radial portions 62 of the bottom wall 54 connected to the curved legs 58 of the side wall 52 are displaced into the side wall during the draw-ironing operation.

The back extruded part is then washed, annealed and coated with a suitable lubricant after which the hollow triangular cup 50 is draw-ironed at room temperature, again preferably in a single stage, into a tri-lobal housing portion 70 as shown in FIGS. 9 and 10.

In the draw-ironing operation, a punch having the internal tri-lobal shape of the housing portion 70 is centered inside the cup 50. The cup 50 and the punch are then pushed shank end first through a ring-like die having the outer tri-lobal shape of the housing portion 70. During this procedure, the outer radial portions 62 of the bottom wall 54 are forced axially and radially inwardly and the side wall 52 is forced radially inwardly to conform to the shape of the tri-lobal punch. The draw-ironing operation results in the formation of the three circumferentially spaced ball tracks 72 comprising outer end walls 74 and curved radial side walls 76 which are connected at their inner ends by arcuate webs 78. The ball tracks 72 are of the desired shape and do not require any machining after the draw-ironing operation.

Figure 12:
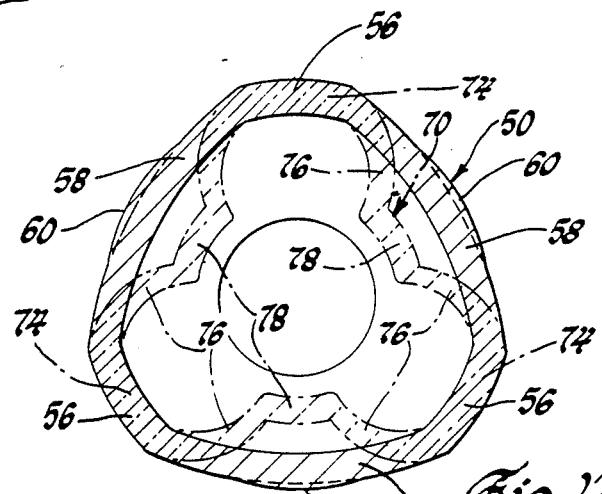
FIG. 12 is a comparison of FIGS. 8 and 10.

FIGS. 11 and 12 compare the tri-lobal housing portion 70 (shown in phantom lines) with the triangularly shaped cup 50 (shown in solid lines) from which it is formed. As a result of the draw-ironing operation, the curved apexes 56 are reduced in thickness and outer diameter slightly to form the outer end walls 74 which otherwise substantially correspond to the curved apexes 56.

On the other hand, the curved legs 58 are deformed and reduced in diameter substantially to form the curved radial side walls 76 and the arcuate webs 78. It is desirable to retain the thickness of the radial side walls 76 and arcuate webs 78 as much as possible so that the inside corners at the opposite ends of the webs 78 are filled out to provide sufficient concavity in the curved radial walls 76 for radially trapping drive balls in the ball tracks 72. This can be enhanced by a slight progressive reduction in thickness in the radial side wall in the radially inward direction as best shown in FIGS. 10 and 12.

As indicated earlier, the function of the bumps 60 is to provide material for retaining a sufficient thickness of the arcuate webs 78 so that the inside corners are filled out. As noted from FIGS. 10 and 12, the thickness of the curved radial side walls 76 diminish in the radially inward direction and this contributes to producing the desired webs.

During the draw-ironing operation, the triangular cup 50 is stretched longitudinally and the resulting tri-lobular housing portion 70 is not only elongated but also has three longitudinal protrusions 80 at the ends of the radial side walls 76 and the arcuate webs 78 due to the displacement of the radial portions 62 of the bottom wall 54 into the side wall. The protrusions 80 are removed during the finishing operations.

Figure 13:
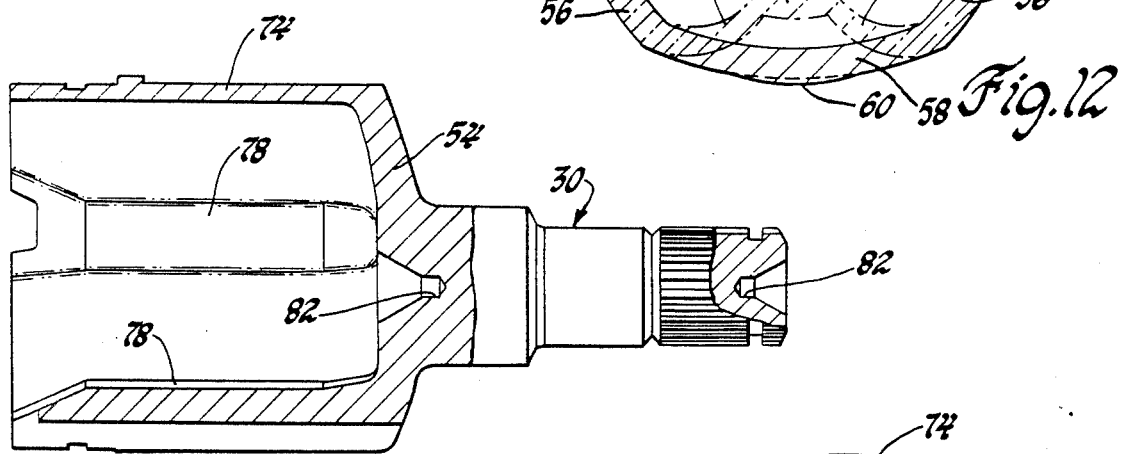
FIG. 13 is a longitudinal, partially sectioned side view of a finished tri-pot housing made from the draw-ironed part shown in FIGS. 9 and 10.
Figure 14:
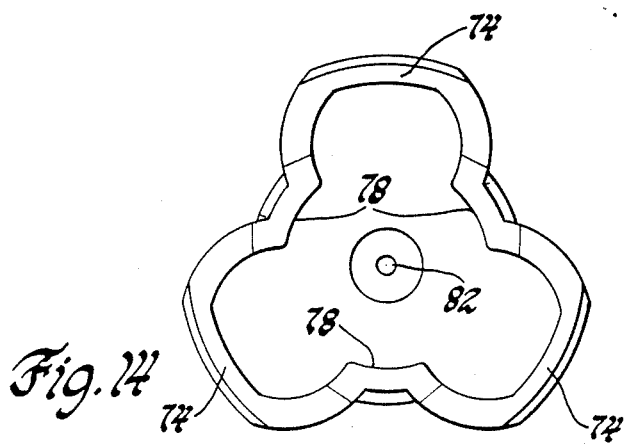
FIG. 14 is an end view of the finished tri-pot housing shown in FIG. 13.

The draw-ironing part shown in FIGS. 9 and 10 is finished as shown in FIGS. 13 and 14 by conventional machining techniques.

Briefly, pilot centers 82 are drilled into the opposite ends of the shank 30 and the part is then turned to machine the shank 30 to the desired shape and to clean up the end face of the bottom wall 54 and the rearward part of the outer end walls 74. The opposite end of the part is then turned to cut away the protrusions 80 and machine the forward part of the outer end walls 74 to provide seal mounting conformations. The inside of the tri-lobular housing portion 70 is then bored to finish the inner diameter of the arcuate webs 78 and provide chamfers at the open end of the tri-lobular housing portion. After machining, the part is heat treated and the shank 30 is finish ground.

The tri-pot universal joint housing, made in accordance with this invention, is of one-piece construction and practically finished in the draw-ironing operation so that there is little waste in material. Moreover, the formation of the housing part in a tri-lobal shape outside as well as inside reduces weight considerably while permitting a greater latitude in the shape of the ball tracks which are formed dimensionally correct. For instance, I have formed ball tracks where the width or diameter is only about one and a half of the depth and it is probably possible to approach a one-to-one ratio.

While my method does contemplate machining of the draw-ironed part, the machining contemplated is insignificant compared to the machining of the three ball tracks 72 which has been eliminated, particularly since the ball tracks 72 are truncated at the outer end to reduce the overall diameter of the housing.

I wish it to be understood that I do not desire to be limited to the exact details shown and described, for obvious modifications will occur to a person skilled in the art. For instance, while the attachment shank 30, which is illustrated, is of the male type, a female type such as the one shown in the aforementioned Peras patent can obviously be used.

The embodiments of the invention in which an exclusive property or privilege is claimed are defined as follows:

1. A method of manufacturing a one-piece tri-pot universal joint housing, comprising the steps of:
   providing a part having a shank at one end and an enlarged cylindrical head at the opposite end,
   backward extruding the enlarged cylindrical head to form a triangularly shaped cup which has an annular triangularly shaped side wall and a triangularly shaped bottom wall,
   and draw-ironing the triangularly shaped cup to form a tri-lobal housing portion which has a tri-lobal side wall defining three internal, circumferentially spaced ball tracks and a tri-lobal bottom wall.

2. The method of manufacturing a one-piece tri-pot universal joint housing as defined in claim 1 wherein the triangularly shaped cup is draw-ironed to form a tri-lobal housing which has a tri-lobal side wall defining three internal circumferentially spaced ball tracks which comprise curved radial side walls for radially trapping drive balls in the drive tracks.

3. The method of manufacturing a one-piece tri-pot universal joint housing as defined in claim 1 wherein the triangularly shaped-cup is draw-ironed to form a tri-lobal housing which has a tri-lobal side wall defining three internal circumferentially spaced ball tracks which comprise curved radial side walls which are connected at their inner ends by arcuate webs and which are filled out at the inside corners at the opposite ends of the webs to provide sufficient concavity in the curved radial side walls for radially trapping drive balls in the drive tracks.

4. A method of manufacturing a one-piece tri-pot universal joint housing, comprising the steps of:
   providing a part having a shank at one end and an enlarged cylindrical head at the opposite end,
   backward extruding the enlarged cylindrical head to form a triangularly shaped cup which has an annular triangularly shaped side wall and a triangularly shaped bottom wall,
   annealing the backward extruded part sufficient for a draw-ironing operation,
   draw-ironing the triangularly shaped cup to form a tri-lobal housing portion which has a tri-lobal side wall defining three internal, circumferentially spaced ball tracks and a tri-lobal bottom wall,
   said tri-lobal side wall being formed from outer portions of the triangularly shaped bottom wall and the triangularly shaped side wall, and having three protrusions at an open end of the housing portion which are formed as a result of displacing outer portions of the triangularly shaped bottom wall into the tri-lobal side wall during the draw-ironing operation.

5. The method of manufacturing a one-piece tri-pot universal joint housing as defined in claim 4 wherein the triangularly shaped cup is draw-ironed to form a tri-lobal housing which has a tri-lobal side wall defining three internal circumferentially spaced ball tracks which comprise curved radial side walls for radially trapping drive balls in the drive tracks.

6. The method of manufacturing a one-piece tri-pot universal joint housing as defined in claim 4 wherein the triangularly shaped-cup is draw-ironed to form a tri-lobal housing which has a tri-lobal side wall defining three internal circumferentially spaced ball tracks which comprise curved radial side walls which are connected at their inner ends by arcuate webs and which are filled out at the inside corners at the opposite ends of the webs to provide sufficient concavity in the curved radial side walls for radially trapping drive balls in the drive tracks.

7. A method of manufacturing a one-piece tri-pot universal joint housing, comprising the steps of:
   providing a part having a shank at one end and an enlarged cylindrical head at the opposite end,
   backward extruding the enlarged cylindrical head to form a triangularly shaped cup which has an annular triangularly shaped side wall of substantially uniform thickness and a triangularly shaped bottom wall having outer portions of a matched thickness, and
   draw-ironing the triangularly shaped cup to form a tri-lobal housing portion which has a tri-lobal side wall of substantially uniform thickness defining three internal circumferentially spaced ball tracks connected at their inner ends by webs, and a tri-lobal bottom wall.

8. The method of manufacturing a one-piece tri-pot universal joint housing as defined in claim 7 wherein the triangularly shaped cup is draw-ironed to form a tri-lobal housing which has a tri-lobal side wall defining three internal circumferentially spaced ball tracks which comprise curved radial side walls for radially trapping drive balls in the drive tracks.

9. The method of manufacturing a one-piece tri-pot universal joint housing as defined in claim 7 wherein the triangularly shaped cup is draw-ironed to form a tri-lobal housing which has a tri-lobal side wall defining three internal circumferentially spaced ball tracks which comprise curved radial side walls which are connected at their inner ends by arcuate webs and which are filled out at the inside corners at the opposite ends of the webs to provide sufficient concavity in the curved radial side walls for radially trapping drive balls in the drive tracks.

10. A method of manufacturing a one-piece tri-pot universal joint housing, comprising the steps of:

providing a part having a shank at one end and an enlarged cylindrical head at the opposite end, backward extruding the enlarged cylindrical head to form a triangularly shaped cup which has an annular triangularly shaped side wall and a triangularly shaped bottom wall, said side wall comprising three curved truncated apexes which are circumferentially spaced and connected by three longer legs of the side wall, and draw-ironing the triangularly shaped cup to form a tri-lobal housing portion which has a tri-lobal side wall and a tri-lobal bottom wall, said tri-lobal side wall comprising end walls formed from the curved truncated apexes and radial side walls and webs formed from the longer legs, said end walls and radial side walls defining three internal circumferentially spaced ball tracks, said webs connecting the inner ends of the radial side walls.

11. The method of manufacturing a one-piece tri-pot universal joint housing as defined in claim 10 wherein the triangularly shaped cup is draw-ironed to form a tri-lobal housing which has a tri-lobal side wall defining three internal circumferentially spaced ball tracks which comprise curved radial side walls for radially trapping drive balls in the drive tracks.

12. The method of manufacturing a one-piece tri-pot universal joint housing as defined in claim 10 wherein the triangularly shaped cup is draw-ironed to form a tri-lobal housing which has a tri-lobal side wall defining three internal circumferentially spaced ball tracks which comprise curved radial side walls which are connected at their inner ends by arcuate webs and which are filled out at the inside corners at the opposite ends of the webs to provide sufficient concavity in the curved radial side walls for radially trapping drive balls in the drive tracks.

* * * * *